US012792637B1

(12) United States Patent
Protas et al.

(10) Patent No.: US 12,792,637 B1
(45) Date of Patent: Nov. 10, 2026

(54) DATA LIST TRACKING SYSTEM

(71) Applicant: Mercury Technologies, Inc., San Francisco, CA (US)

(72) Inventors: Sam Protas, Philadelphia, PA (US); Aaron Cohn, San Francisco, CA (US); Robert Holt, Seattle, WA (US); Lev Dubinets, Seattle, WA (US)

(73) Assignee: Mercury Technologies, Inc., San Francisco, CA (US)

( * ) Notice: Subject to any disclaimer, the term of this patent is extended or adjusted under 35 U.S.C. 154(b) by 0 days.

(21) Appl. No.: 19/192,101

(22) Filed: Apr. 28, 2025

(51) Int. Cl.
*G06F 16/20* (2019.01)
*G06F 16/28* (2019.01)

(52) U.S. Cl.
CPC .................................. *G06F 16/285* (2019.01)

(58) Field of Classification Search
None
See application file for complete search history.

(56) References Cited

U.S. PATENT DOCUMENTS

| | | | | |
|---|---|---|---|---|
| 8,577,902 | B1 * | 11/2013 | Ye | H03M 7/3077 707/693 |
| 11,461,310 | B2 | 10/2022 | Hughes | |
| 12,541,798 | B1 * | 2/2026 | Verhelle | G06Q 40/08 |
| 2016/0360433 | A1 * | 12/2016 | Vaderna | H04W 8/005 |
| 2020/0193459 | A1 * | 6/2020 | Chakraborty | G06F 18/23 |
| 2021/0271681 | A1 | 9/2021 | Jayaram et al. | |
| 2024/0311393 | A1 * | 9/2024 | Marker | G06F 16/273 |
| 2025/0139125 | A1 | 5/2025 | Patton | |

* cited by examiner

*Primary Examiner* — Jau Shya Meng
(74) *Attorney, Agent, or Firm* — Knobbe, Martens, Olson & Bear, LLP

(57) ABSTRACT

A system can enable increased data throughput of recording and/or processing paired data items associated with paired data item lists without reducing (or while mitigating reduction of) the accuracy of tracking the data interactions associated with said data lists. For example, the improved system can achieve automated data monitoring and identification, gathering, and collation of relevant data for further processing that may increase the quantity of paired data items that are recorded and/or processed in a period of time and/or reduce the time taken to record and/or process a plurality of paired data items, while maintaining concurrency between the data lists and the events associated with the data items in the list. The system may improve data throughput without increasing (or while mitigating increases in) processing needs, compute overhead, and/or storage requirements.

20 Claims, 6 Drawing Sheets

DATA LIST TRACKING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated herein by reference under 37 CFR 1.57.

TECHNICAL FIELD

Implementations of the present disclosure relate to systems and techniques for tracking data item interactions among pluralities of data lists. More specifically, implementations of the present disclosure relate to computerized systems and techniques that improve tracking of data item interactions among paired data lists, such as overlapping data lists that may reduce processing times and/or increase data throughput.

BACKGROUND

User data includes any information collected from or about a user when the user interacts with a system, platform, entity, or service. Such data can include data item pairs and may be recorded to one or more data lists.

SUMMARY

The systems, methods, and devices described herein each have several aspects, no single one of which is solely responsible for its desirable attributes. Without limiting the scope of this disclosure, several non-limiting features will now be described briefly.

Conventional systems often implement and/or interact with a plurality of data lists to improve the robustness with which user data is aggregated, monitored, and/or processed, such as for monitoring and/or analyzing data interactions, analyzing user activity, and/or the like. User data can include data item pairs, where one data item in the pair is associated with a first data list and the other data item in the pair is associated with a second data list. In this way, the data lists may similarly be said to be paired. In some cases, data lists can include overlapping lists, where the overlapping list is paired with two or more data lists. This situation may arise when a plurality of users interact with a common system, service, entity, and/or the like, such as further described herein. To accurately track data interactions associated with paired data lists (such as overlapping lists), systems typically implement blocks and/or queue-based methods when recording and/or processing said paired data items to help prevent race conditions and/or inconsistencies between the data lists and the events associated with the data items in the data lists. However, this can increase processing requirements, increase compute overhead, and/or increase storage requirements, each of which (alone or in combination) may reduce data throughput of such systems.

Advantageously, and according to various implementations, systems, methods, and associated functionality of the present disclosure (generally referred to herein as the "system"), can increase data throughput of recording and/or processing paired data items associated with paired data item lists without reducing (or while mitigating reduction of) the accuracy of tracking the data interactions associated with said data lists. The system may record and/or process data items, and continuously and/or periodically initiate checkpoints during which the system can determine data item orders and update values to retroactively track data item interactions associated with paired data lists. Retroactively tracking the data item interactions can help ensure that any discrepancies between underlying events and data item interactions with paired lists are reconciled such that the data lists accurately reflect the underlying events. In various implementations, computation of data list values may be order-independent. In this way, the system can aggregate data items to determine and/or update data list values without a need to block data transactions and/or without a need to wait for retroactive ordering. This can further reduce compute overhead and/or storage requirements of the system.

Various combinations of the above and below recited features, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise one or more computer-readable storage mediums or devices comprising, configured to store, and/or storing program instructions, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums or devices, and/or one or more computer-readable storage mediums or devices, are disclosed, wherein the computer-readable storage mediums comprise, are configured to store, and/or store program instructions, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings.

DETAILED DESCRIPTION

Figure 1:
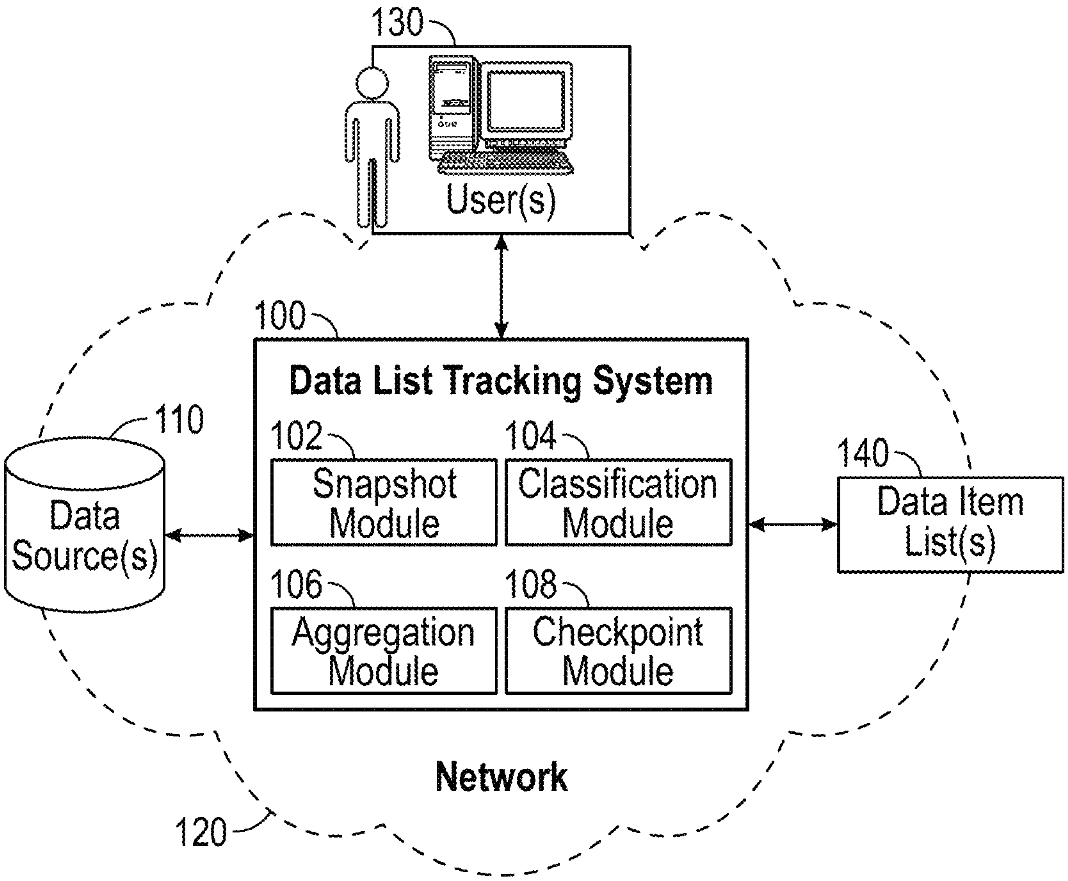
FIG. 1 is a block diagram illustrating an example data list tracking system, according to various implementations of the present disclosure.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality. LLMs can be extremely useful for natural language processing, including receiving natural language prompts and providing natural language responses based on the text on which the model is trained. LLMs may not be data security- or data permissions-aware, because they generally do not retain permissions information associated with the text upon which they are trained. Thus, responses provided by LLMs may be limited to any particular permissions-based portion of the model.

While certain aspects and implementations are discussed herein with reference to use of a language model, LLM, AI, and/or AI system, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, AI system, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

Data Processing Service (or "Service" or "Plug-in") can be any service that receives and/or responds to requests for data and/or data processing. A Plug-in may be accessible via an API that is exposed to an Artificial Intelligence System (and/or other remote systems) and allows data processing requests to be received via API calls from those systems (e.g., an AIS). A few examples of services or plug-ins include a table search service, a filter service, an object search service, a text search service, or any other appropriate search service, indexing services, services for formatting text or visual graphics, services for generating, creating, embedding and/or managing interactive objects in a graphical user interface, services for caching data, services for writing to databases, or any other data retrieval, processing, and/or analysis function.

Prompt (or "LLM Prompt" or "Natural Language Prompt" or "Model Input"): a term, phrase, question, and/or statement written in a human language (e.g., English, Chinese, Spanish, and/or the like) that serves as a starting point for a language model and/or other language processing. A prompt may include only a user input or may be generated based on a user input, such as by a prompt generation module (e.g., of an artificial intelligence system) that supplements a user input with instructions, examples, and/or information that may improve the effectiveness (e.g., accuracy and/or relevance) of an output from the language model. A prompt may be provided to an LLM, which the LLM can use to generate a response (or "model output"). Depending on the LLM, a prompt may be multi-modal, e.g., including data in non-text formats, such as images, audio, video, and/or the like.

Overview

Conventional systems often include data item lists (also referred to herein as "data lists") to improve the robustness with which user data is aggregated, monitored, and/or processed, such as for monitoring and/or analyzing data interactions, analyzing user activity, and/or the like. User data can include data items, such as incoming and/or outgoing data items, which may be anything, and which may be associated with an underlying event. The underlying event may be associated with user interactions with a system, a service, an entity, and/or the like. User interactions, in various implementations, can include queries, requests, calls, and/or the like that is made to (and/or received by) a system, a service, an entity, and/or the like. For example, the underlying event may be associated with scheduling a doctor's visit, booking a flight, making restaurant reservations, and/or the like where multiple users may interact with a common system, service, entity, and/or the like. In some examples, the underlying event may be associated with a transaction involving one or more user accounts (e.g., a bank account, cash account, and/or the like), such as may be associated with an entity. An entity may be a person, a place, an organization, a market instrument, other noun, and/or the like.

Incoming and outgoing data items may be paired together (e.g., they may represent different but related aspects of an underlying event), but may belong to different data item lists. A "data item list" may be an ordered or unordered collection of data items. In some cases, different pairs of data items may be associated with paired data item lists, where one list in the pair of lists includes one data item of a data item pair, and the other list in the pair of lists includes the other data item of the data item pair. In some cases, a data item list may be an overlapping list. An "overlapping list" may refer to a data item list that is paired with a plurality of other data item lists. This may occur when multiple users interact with a common system, service, entity, and/or the like. For example, an incoming data item may belong to list A and the corresponding outgoing data item may belong to list B. Additionally, another incoming data item may belong to list C, and its corresponding outgoing data item may belong to list B. List B may be considered to be paired with lists A and/or C.

However, when different data item pairs are associated with paired data item lists (e.g., overlapping lists), conventional systems typically implement blocks, queues, and/or queue-based methods when processing data items. This typically can help ensure that the system's tracking of data item interactions associated with the data lists is aligned with the underlying events associated with said data items. This can help prevent race conditions and/or inconsistencies between the data lists and the events associated with the data items in the data list. For example, the system may sequence the processing of data items, such that an earlier data item pair (e.g., belonging to lists A and B) is processed before processing a later data item pair (e.g., belonging to lists C and B) so as to accurately track data interactions associated with the paired data lists (e.g., any of lists A, B, and/or C).

Processing data items can include processing data item transactions. A "data item transaction" may refer to a sequence of one or more operations performed on a data list, database, and/or the like, that is treated as a single unit of work. For example, a data transaction can include, but is not limited to: assigning unique identifiers to data items; reading, writing, updating (and/or modifying), and/or committing data items to data lists, databases, and/or the like; making changes visible to the system; background cleanup; and/or the like.

Without blocks (or similar features), certain data items associated with events that occur at an earlier time and certain other data items associated with events that occur at a later time may be processed in varying orders due to multiple different factors such as permissions, processing times, network interruptions, and/or the like. This can potentially disrupt the tracking of data item interactions, such as by introducing discrepancies between the interactions and/or events engaged in by a user and the way that resulting data items appear in data lists.

Consequently, such systems can lead to reduced data throughput of processing data items of data item pairs since processing of subsequent data items often must wait for processing of earlier data items to complete. The reduction in data throughput may be exacerbated as the quantity of data item pairs and overlapping lists grows (e.g., such as may result from a greater quantity of users interacting with a common system, service, entity, and/or the like). For example, if a first data item pair belongs to lists A and B, a second data item pair belongs to lists B and C, and a third data item pair belongs to lists C and D, and so on, processing of the data items of the third data item pair may be blocked by the processing of the data items of the first and then second data item pairs.

Advantageously, and according to various implementations, systems, methods, and associated functionality of the present disclosure (generally referred to herein as the "system"), can increase data throughput of processing paired data items associated with paired data item lists without reducing (or while mitigating reduction of) the accuracy of tracking the data interactions associated with said data lists. For example, the improved system can achieve automated data monitoring and identification, gathering, and collation of relevant data for further processing that may increase the quantity of paired data items that are processed in a period of time and/or reduce the time taken to process a plurality of paired data items. This may be achieved while maintaining concurrency between the data lists and the underlying events associated with the data items in the list. In various implementations, the system may improve data throughput without increasing (or while mitigating increases in) processing needs, compute overhead, and/or storage requirements.

In various implementations, the system may (continuously) process data items of detected data item pairs in real-time or substantially real-time as, for example, underlying events occur and/or users interact with the system. This can prevent (or mitigate) any processing of later-detected data items from being blocked by processing of earlier-detected data items. The processing of data item transactions may be punctuated with periods of time during which the system initiates checkpoints to track data item interactions associated with data item lists (e.g., overlapping data lists and/or data lists that are paired with overlapping lists). A checkpoint may allow the system to track data item interactions associated with one or more lists up to the point in time of the checkpoint such that data item tracking is current and accurate as of initiation of said checkpoint. However, the system may not account for any data item interactions associated with data items that are processed during and/or after the checkpoint, as further described herein. Advantageously, the system can continuously and/or periodically initiate checkpoints to continuously and/or periodically update the tracking of data item interactions associated with the data item lists. The system may initiate checkpoints based on user input, classifications assigned to the data items pairs, predetermined times, and/or the volume of data item transactions (e.g., data item processing) being handled by the system (e.g., based on predetermined thresholds, identified trends, and/or the like).

In various implementations, the system may initiate checkpoints for data tracking as a background process, thereby permitting the system to (continuously) process detected data items uninterrupted. In various implementations, during a checkpoint, the system can be configured to preserve a consistent view of a data item list at the specific point in time of the checkpoint, thereby allowing the system to read data without being affected, for example, by concurrent updates and/or modifications to the list (e.g., resulting from data item insertions, removals, and/or modifications being committed to the list during and/or after initiation of the checkpoint), such as further described herein. In this way, the system can track data interactions associated with one or more paired data lists without implementing blocks that may otherwise reduce data throughput.

Tracking data item interactions associated with paired data lists (e.g., overlapping lists) can include determining and/or updating the order of data items that are recorded (e.g., inserted and/or committed) to said lists. The system may determine the order of data items in a data list based on classifications assigned to the data items, the state of the data items, metadata associated with the data items, and/or the like. The system can determine the order of data items in a list after the data items have been recorded and/or processed, such as after the data items have been inserted into and/or committed to the list. For example, the order in which data items are inserted into and/or committed to a data list may not reflect the order in which underlying events associated with said data items occurred or the order in which users interacted with a common system, service, entity, and/or the like.

In various implementations, the system can determine and/or update list values associated with the paired lists. The list value associated with a particular data item list can be representative of data item interactions involving said data list. For example, the list value may be representative of scheduled appointments for a doctor's office for a certain day, bookings for a certain flight, reservations for a restaurant on a particular night, and/or the like. In some examples, the list value may be associated with the balance of a user account, such as a bank account or other account. In this way, each data item of a data item pair may be associated with or assigned its own value (e.g., positive or negative value). In various implementations, the list value associated with a data item list may be a global value, such that the list value is determined and/or updated based on data item pairs associated with a plurality of users (e.g., all users) that may be interacting with a common system, service, entity, and/or the like. The list value may be determined and/or updated in an open- or closed-loop so that the most current list value is continuously and/or periodically recalculated. In various implementations, list value determinations and/or updates may be performed as a background process and/or may be performed independently of the system determining the order of data items in a data list.

Example System Relating to Tracking Data Item Interactions Associated with Data Lists FIG. 1 is a block diagram illustrating an example Data List Tracking System 100 (also referred to herein as "system 100") in communication with one or more data sources 110, user(s) 130, and/or data list(s) 140 over a network 120. The system 100 can include, but is not limited to, classification module 102 and/or checkpoint module 106. In various implementations, the system 100 can comprise the system of the present disclosure, in whole or in part. In various implementations, the system 100, and/or various aspects or components of the system 100, may be considered part of, or comprise, the system of the present disclosure. The system of the present disclosure, in various implementations, may include additional features, aspects, components, and/or functionality.

Figure 5:
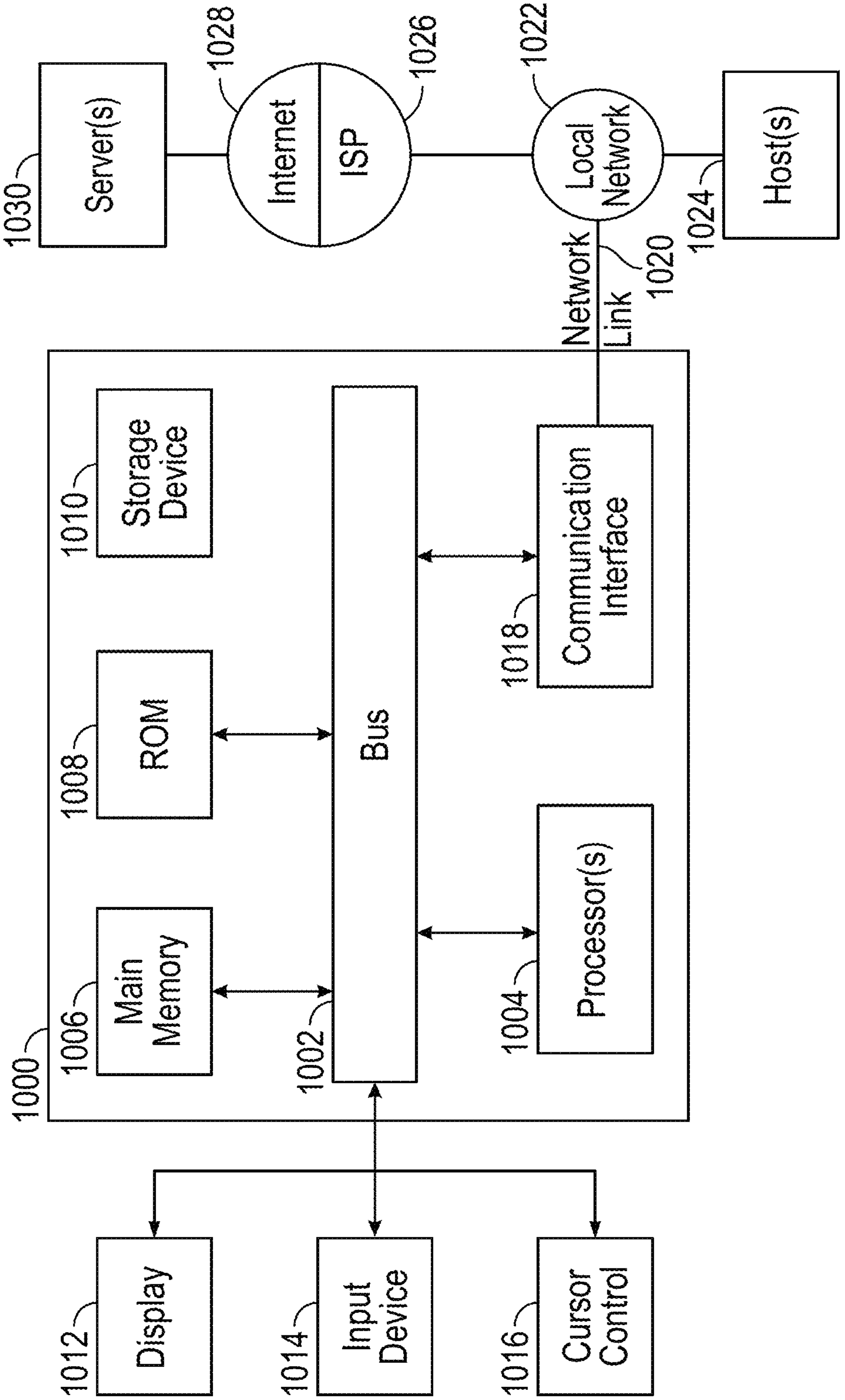
FIG. 5 is a block diagram of an example computer system useable with the various implementations of the present disclosure.

The operations of system 100, including classification module 102, snapshot module 104, and/or checkpoint module 106 can be performed by one or more hardware processors operating under control of computer-executable program instructions which can be stored on non-transitory computer readable media, as shown and/or described in FIG. 5. The system 100, including classification module 102 and/or checkpoint module 106, can include and/or be implemented in one or more computing devices including one or more hardware processors such as shown and/or described in FIG. 5.

In the example of FIG. 1, the various systems, devices, and/or components are in communication via a network 120.

The network 120 can include one or more communications networks. The network 120 can include a plurality of computing devices configured to communicate with one another. The network 120 can include routers. The network 120 can include the Internet. The network 120 can include a cellular network. The network 120 can include any combination of a local area network ("LAN") and/or a wide area network ("WAN"), or the like. Accordingly, various computing devices can communicate with one another directly or indirectly via any appropriate communications links and/or networks, such as network 120 (e.g., one or more communications links, one or more computer networks, one or more wired or wireless connections, the Internet, any combination of the foregoing, and/or the like). In various implementations, modules of the illustrated components (see FIG. 2, for example) may communicate via an internal bus and/or via the network 120.

Communication over the network 120 can include a variety of communication protocols, including wired communication, wireless communication, wire-like communication, far-field communication (such as transferring energy via electromagnetic radiation (e.g., radio waves)). Example communication protocols can include Wi-Fi, Bluetooth®, ZigBee®, Z-wave®, cellular telephony, such as long-term evolution (LTE) and/or 1G, 2G, 3G, 4G, 5G, etc., infrared, satellite transmission, proprietary protocols, combinations of the same, and the like.

In various implementations, the data list tracking system 100 (and/or components thereof such as the classification module 102, snapshot module 104, and/or checkpoint module 106) can include and/or communicate with one or more artificial intelligence (AI) systems. The AI system(s) may be locally hosted, cloud managed, accessed via one or more Application Programming Interfaces ("APIs"), and/or any combination of the foregoing and/or the like. In various implementations, the AI system(s) may be implemented as a data processing service such as any available type of service.

The system 100 can leverage one or more AI systems (and/or AI models, LLMs, ML models, and/or the like) for tracking data item interactions associated with one or more data lists. In various implementations, the system 100 can leverage one or more AI systems for classifying data item pairs and/or data items. For example, the system 100 can leverage one or more AI systems for determining which data items are checked data items or unchecked data items. In various implementations, the system 100 can leverage one or more AI systems for generating snapshots, initiating checkpoints, determining orders of data items within a data list, and/or determining/updating list values. The AI system (s) may be configured to analyze one or more sets of data items, historical data, and/or the like, to identify patterns and/or trends and segment data items for further processing. The AI system(s) can receive one or more inputs (e.g., natural language prompts) from the system 100 and provide one or more responses. In various implementations, the system 100 may use the AI system(s) to establish an initial baseline for analyzing user data and refine the model as data is collected over time to achieve improved deterministic behavior.

The AI system(s) may include and/or have access to a large language model ("LLM"), other language models, and/or machine learning models (MLs), which may be fine-tuned or trained on appropriate training data (e.g., annotated data showing correct or incorrect pairings of queries and responses, such as pairings of data items and classifications). In various implementations, the LLMs and/or other models (including ML models) of the present disclosure may be locally hosted, cloud managed, accessed via one or more APIs, and/or any combination of the foregoing and/or the like. Additionally, in various implementations, the LLMs and/or other models (including ML models) of the present disclosure may be implemented in or by electronic hardware such as application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, look-up tables, translation tables, equations, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Snapshot Module 102 can be configured to generate snapshots of data lists. A "snapshot" may be a representation of a data list at the time of the snapshot, such as at a time that the data list is observed. Upon initiation of a snapshot, the snapshot module 102 may observe visible data items in a data list. In this way, the snapshot module 102 may identify which data items included in a data list are visible to the system 100 at the time of the snapshot. The snapshot can reflect the state of all visible data items in a data list, such as data items that have been inserted into and/or committed to the data list as of the time of the snapshot. In various implementations, visible data items may include only data items that have been committed to a data list up until the time that the snapshot is generated. In this way, the snapshot module 102 may not observe (or may ignore) any data items in a list that have yet to be committed as of the time of the snapshot. Put another way, snapshots may include only some of the data items inserted into the data list as uncommitted data items may not appear in or may be excluded from the snapshot. Advantageously, this can help prevent dirty reads and/or read-write conflicts. In various implementations, the snapshot can be a multiversion concurrency control (MVCC) snapshot.

In various implementations, upon initiation of a snapshot, the snapshot module 102 may observe only data items that have been inserted into and/or committed to a data list since generation of the most recent previous snapshot. Put another way, the snapshot may include data items inserted into and/or committed to a data list up to the previous snapshot. For example, if the snapshot module 102 generates a first snapshot at a first time and later generates a second snapshot at a second time, the second snapshot may include only data items that were inserted into and/or committed to the data list since the first time and up until the second time (e.g., during and/or after generation of the first snapshot, but before generation of the second snapshot). Accordingly, each snapshot can be distinct from each other in that no two snapshots include any of the same data items. Advantageously, this can prevent the system from having to observe all historical data items in the data list, which may otherwise increase processing demands, increase compute overhead, and/or increase storage requirements. In various implementations, a snapshot can include unique identifiers of previous snapshots such that each subsequent snapshot is a representation of all data items committed to a data list as of the time of the snapshot.

In various implementations, the snapshot module 102 may generate snapshots upon detection of a snapshot condition. Snapshot conditions can include, but are not limited to, user input to generate a snapshot (e.g., user input to lock or view a data list), detection of certain data item pairs (e.g., detection of checked data item pairs), beginning and/or select commands of data transactions associated with certain data items, and/or underlying events (e.g., checked events), to name a few. The snapshot module 102 may store each snapshot (e.g., data representative of the snapshot) in non-transitory computer readable media that is local to system 100 and/or part of a common computing environment and readily accessible by the system 100. In various implementations, the snapshot module 104 may store each snapshot in non-transitory computer readable media that is external of the system 100.

Each snapshot may be associated with a data item. In various implementations, the system may record a snapshot along with its associated data item to the data list. The snapshots may be accessed, read, and/or retrieved at another time for further processing.

Classification Module 104 can be configured to classify data item pairs and/or data items of said pairs. In various implementations, the classification module 104 may classify raw (e.g., unfiltered, unprocessed) data item pairs and/or processed data item pairs. The classification module 104 can classify data item pairs and/or data items as either checked or unchecked. Checked data items pairs can include checked data items. Unchecked data item pairs can include unchecked data items. The classification module 104 may classify a data item as a checked data item if said data item is associated with a snapshot. For example, if the classification module 104 identifies that a snapshot has been recorded along with a particular data item, the classification module 104 may classify the data item as checked. Conversely, the classification module 104 may classify a data item as an unchecked data item if said data item is not associated with a snapshot. For example, if the classification module 104 identifies an absence of any snapshots, such as no snapshot having been generated and/or recorded along with a particular data item, the classification module 104 may classify said data item as unchecked.

In various implementations, the classification module 104 may be configured to classify data item pairs according to a set of rules, such as may be defined by a user (e.g., user 130) of the system 100 and/or by a developer of the system 100. In various implementations, the classification module 102 can be configured to classify data item pairs based on the underlying events associated with the data item pairs. For example, in various implementations, a checked data item pair may be associated with a checked event. Checked events can include, but are not limited to, irreversible events, such as events that are irrevocable or uncontestable such that they cannot be undone once associated data item transactions are complete. This may include, for example, non-refundable travel bookings, wire transfers, and/or the like. In some examples, unchecked data items pairs may be associated with unchecked events. Unchecked events can include, but are not limited to, reversible events, such as events that are revocable or contestable such that they can be undone even if associated data item transactions are complete. This may include, for example, restaurant reservations, card transactions, scheduling doctors' appointments, and/or the like. Additionally or alternatively, checked data items may be independent of any previously recorded and/or processed data items, whereas unchecked data items may be related to previously recorded and/or processed data items.

Aggregation Module 106 can be configured to determine and/or update data list values. The aggregation module 106 can aggregate all data items that have been recorded and/or committed to a data list to compute the associated list value. In various implementations, the aggregation module 106 may compute the list value independently of any checkpoint initiation (e.g., independent of the system determining data item orders). For example, the aggregation module 106 may determine and/or update the list value continuously and/or periodically in real-time or substantially real-time as data items are inserted and/or committed to the data list, in response to user input to compute a list value, at predetermined intervals, combinations thereof, and the like.

In various implementations, the aggregation module 106 can compute the list value in response to initiation of a checkpoint. For example, the aggregation module 106 may update the list value based on the values of the data items that are included in the checkpoint. In this way, a list value may be based on all data items inserted into and/or committed to the list up to the point in time of the checkpoint. Prior to initiation of the checkpoint, the list value may be based on the values of all data items in the list up until the most recent previous checkpoint. Upon initiation of a subsequent checkpoint, the aggregation module 106 may update the list value based on the values of data items inserted into and/or committed to the data list since initiation of the checkpoint and up until the subsequent checkpoint, and so on.

Checkpoint Module 108 can be configured to initiate checkpoints for tracking data interactions associated with one or more data lists, such as paired data lists (e.g., overlapping lists and/or data lists paired with overlapping lists). Upon initiation of a checkpoint, the checkpoint module 108 may receive, access, and/or retrieve one or more stored snapshots of one or more data lists, such as of one or more paired data lists. In various implementations, the checkpoint module 108 may receive, access, and/or retrieve only snapshots that have been initiated and/or stored since the most recent previous checkpoint.

The checkpoint module 108 may be configured to determine an order of present data items. "Present" data items may refer to data items that fall within a checkpoint window, such as data items that have been recorded to (e.g., inserted into and/or committed to) a data list since the most recent previous checkpoint and up until the present checkpoint (e.g., the currently initiated checkpoint). In this way, the checkpoint window may extend from the most recent previous checkpoint to the present checkpoint. The previous checkpoint may be associated with a previous time (e.g., the time at which the previous checkpoint initiated), and the present checkpoint may be associated with a present time (e.g., the time at which the present checkpoint initiated) that is later than the previous time. In this way, the checkpoint window may extend from the previous time up to the present time.

The checkpoint module 108 may be configured to determine the order of the present data items based on the snapshots. In various implementations, the checkpoint module 108 may be configured to determine the order of the present data items based on the classifications of the said data items. In various implementations, the checkpoint module 108 may determine the order of the present data items based on the state of said data items. In various implementations, the checkpoint module 108 may determine the order of the present data items based on unique identifiers of said data items.

When the checkpoint module 108 initiates a checkpoint, the checkpoint module 108 may analyze only the present data items even though new data items may be inserted and/or committed to the data list during or after initiation of the checkpoint (e.g., while the checkpoint module 108 is analyzing the present data item(s)). In this way, analysis of data items may be unaffected by concurrent updates and/or modifications to the data list. The checkpoint module 108 may analyze the present data items while the system continues to process new data items. For example, the snapshot module 102 may generate and/or store new snapshots while the checkpoint module 108 analyzes previously generated and/or recorded snapshot(s).

In various implementations, the system may initiate checkpoints based on predetermined times. For example, the checkpoint module 106 may initiate checkpoints according to a schedule. In various implementations, the checkpoint module 106 may initiate checkpoints based on user input (such as received from user 130).

In various implementations, the checkpoint module 106 may initiate checkpoints based on the volume of data recordation and/or processing being handled by the system. For example, the checkpoint module 106 may be configured to initiate checkpoints during periods of time when there are fewer underlying events occurring, fewer users interacting with the system, and/or the like. The checkpoint module 106 may monitor the quantity of detected data items and analyze whether the quantity of detected data items satisfies (e.g., is greater than, greater than or equal to, less than, less than or equal to, and/or equal to) a threshold condition. The threshold condition can include upper and lower limits. The threshold condition can include a value and/or range of values. The checkpoint module 106 may be configured to determine a difference in the quantity of data items between a first time and a second time. The checkpoint module 106 may be configured to determine whether the quantity of detected data items is changing and/or changing in a certain direction. In various implementations, the checkpoint module 106 can determine whether a value, change in value, rate of change in value, and/or change in the rate of change in value of the quantity of detected data items satisfies the threshold condition.

In various implementations, after a checkpoint completes, the checkpoint module 106 may discard one or more snapshots. However, data items included in the snapshots may be retained by the system (e.g., system 100, data sources 110, data lists 140, and/or the like). A checkpoint may complete once the checkpoint module 106 determines an order of the current data items. In various implementations, a checkpoint may complete once the checkpoint module 106 determines and/or updates a list value.

Data list tracking system 100 can communicate with one or more Data Sources 110 in the course of performing one or more tasks associated with tracking data interactions associated with one or more paired data lists. The data source(s) 110 can include user dataset(s) including historical user data. For example, the data source(s) 110 can include one or more user databases, entity databases, third-party providers, public APIs, entity-specific APIs, proprietary APIs, and/or the like. In various implementations, the data source(s) 110 can include a global list of users and/or entities. The data source(s) 110 may be part of the system 100, such as may be stored on non-transitory computer readable media that is local to system 100 and/or part of a common computing environment and readily accessible by the system 100. In various implementations, the data source(s) 110 may be external of the system 100 and accessed via, for example, API calls, queries (e.g., SQL query), requests (e.g., HTTP request), batch file downloads (e.g., JSON, CVS, Excel, and the like), batch data transfers (e.g., file transfer protocol), database management tools (e.g., PostregSQL), and/or the like.

Data source(s) 110 may be stored in one or more data stores, databases, storage components, storage systems, and/or any combination of the foregoing and/or the like, which can include any computer readable storage medium and/or device (or collection of data storage mediums and/or devices), including, but not limited to, one or more memory devices that store data, including without limitation, dynamic and/or static random access memory (RAM), programmable read-only memory (PROM), erasable programmable read-only memory (EPROM), electrically erasable programmable read-only memory (EEPROM), optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. In various implementations, data source(s) 110 may be stored locally on the system 100. In various implementations, the data source(s) 110 may be stored on one or more external servers that are in communication with the system 100, such as via network 120.

In various implementations, the data source(s) 110 may be a data processing service, which can include one or more search services (e.g., a table search service, an object search service, a text search service, or any other appropriate search service), indexing services, services for formatting text or visual graphics, services for generating, creating, embedding and/or managing interactive objects in a graphical user interface, services for caching data, services for writing to databases, or any other services. In various implementations, information provided in a prompt to an LLM enables the LLM to return a properly formatted request for further information from a plug-in, such as in the form of an API call to a data processing service. Thus, an LLM may indirectly request (via the system 100) for data processing services to perform a specific process. The output from the data processing service may then be provided back to the LLM for further processing of a task and/or to develop a final result to be provided to the user 130. In various implementations, the data processing services may be a part of the system 100. In various implementations, the data processing services may be external to the system 100.

Data list tracking system 100 can communicate with one or more Data Lists 140 in the course of performing one or more tasks associated with tracking data interactions associated with one or more paired data lists. The data list(s) 140 may be unordered or ordered collections of data items. In various implementations, the data list(s) 140 can include paired data lists. In various implementations, the data list(s) 140 can include overlapping data lists. The data list(s) 140 may be part of the system 100, such as may be stored on non-transitory computer readable media that is local to system 100 and/or part of a common computing environment and readily accessible by the system 100. In various implementations, the data list(s) 140 may be external of the system 100 and accessed via, for example, API calls, queries (e.g., SQL query), requests (e.g., HTTP request), batch file downloads (e.g., JSON, CVS, Excel, and the like), batch data transfers (e.g., file transfer protocol), database management tools (e.g., PostregSQL), and/or the like. In various implementations, the data source(s) 110 can include the data list(s) 140.

In the example of FIG. 1, a user 130 (which generally refers to a human user and/or computing device of any type that may be operated by a human user) provides user input that can cause and/or modify one or more operations and/or processes performed by the system 100 and/or components thereof.

Figure 2:
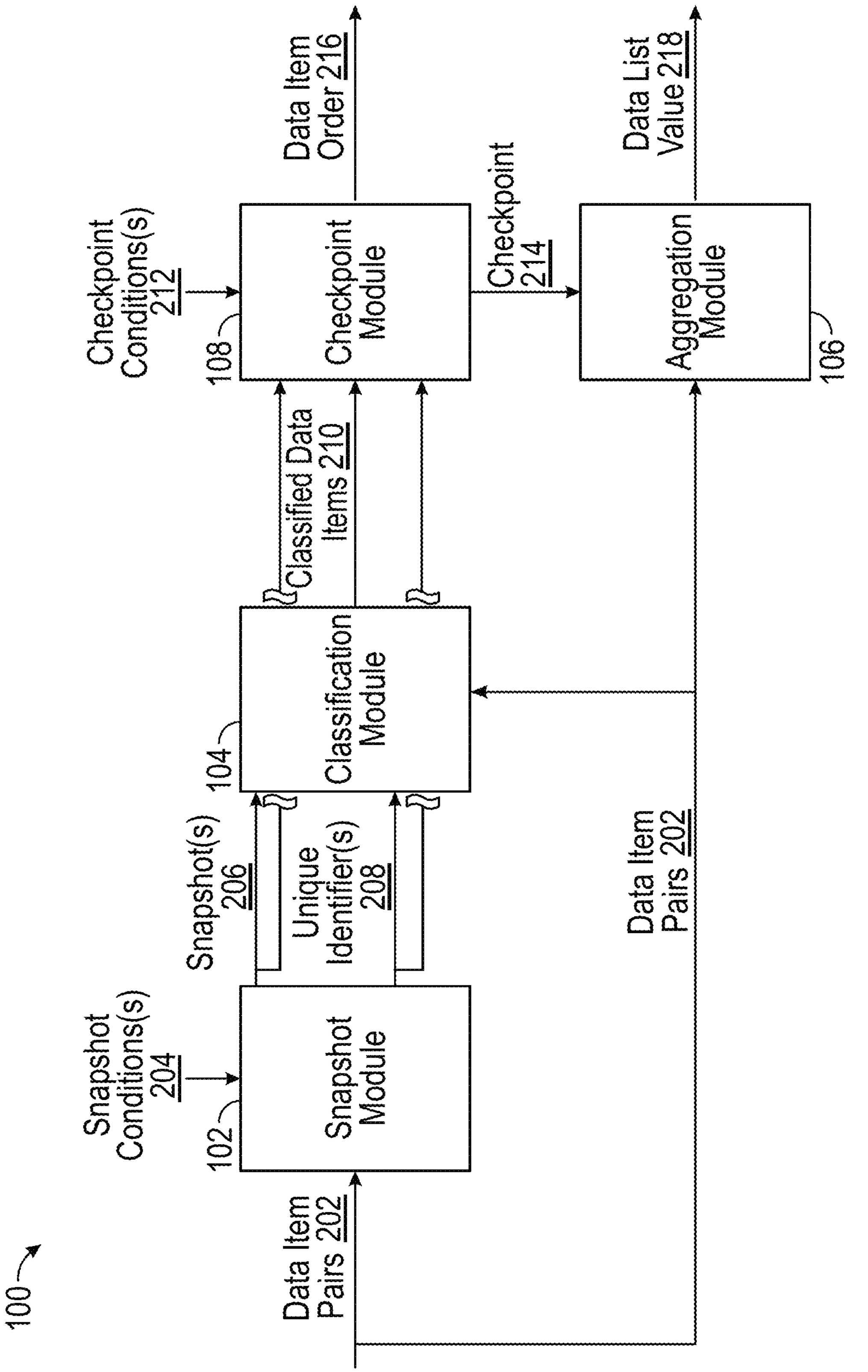
FIG. 2 is a block diagram illustrating data interactions among components of the data list tracking system, according to various implementations of the present disclosure.

FIG. 2 is an example schematic input and output flow diagram illustrating how one or more modules and/or engines of the data list tracking system 100 may interact to monitor and/or analyze data items, such as for tracking data item interactions associated with paired data lists. The system 100 can be configured to receive one or more inputs and generate one or more intermediate and/or final outputs. In various implementations, the intermediate outputs, may be provided to other components of the system 100 for further processing.

The snapshot module 102 can generate one or more snapshots 206 upon detecting a snapshot condition 204, such as described herein. For example, upon receiving user input to lock and/or observe a target data list, the snapshot module 102 can generate a snapshot 206 of the target list. The user input may correspond to an underlying event, and data item pair(s) 202 resulting from the underlying event can be associated with the target data list. The snapshot module 102 may generate the snapshot 206 upon beginning a data transaction between a data item (of data item pair 202) and the target list. In some examples, the snapshot module 102 may generate the snapshot 206 during a select command that is partway through the data transaction. In various implementations, the underlying event may (automatically, e.g., without requiring additional user activity) trigger generation of the snapshot 206. For example, when a user 130 interacts with the system 100, the snapshot generation module 102 may monitor for whether a snapshot condition 204 is satisfied and automatically generate a snapshot 206.

The snapshot(s) 206 can include a representation of the visible data list (e.g., visible to the system 100 and/or user 130) as of the time that the snapshot is generated. In this way, each snapshot 206 can include one or more data items that have been inserted into and/or committed to a data list as of the time that the snapshot is generated. The snapshot module 102 may generate data representative of the snapshot(s) 206, such as data representative of the data items included in the snapshot(s) 206. For example, each snapshot 206 may be assigned a snapshot identifier indicative of the content of the snapshot 206. The snapshot identifier may be a unique identifier 208 for the snapshot 206. The snapshot identifier may be a string, one or more numbers, and/or the like. In various implementations, the snapshot identifier may be represented by metadata of the snapshot 206.

Each generated snapshot 206 may be paired with a single data item, such as the data item associated with (e.g., originating from) the snapshot condition 204. In various implementations, the snapshot module 102 may record each snapshot 206 to the data list alongside its respective paired data item. For example, the snapshot module 102 may record each snapshot identifier alongside the corresponding data item.

The classification module 104 can receive, access, or retrieve one or more datasets from a data source (e.g., data source(s) 110) via, for example, a data source call, query, request, and/or the like. The classification module 102 can include one or more processes for analyzing, cleansing, editing, reducing, wrangling, or otherwise processing data, such as data item pair(s) 202, snapshot(s) 206, and/or unique identifier(s) 208 for further processing or analysis by one or more components of the system 100. The classification module 104 may classify data item pairs 202 as either checked or unchecked data item pairs to output classified data item(s) 210. In various implementations, the classification module 104 may classify the data items pairs based on the presence or absence of a recorded snapshot. For example, if the classification module 104 identifies that a snapshot 206 has been recorded alongside a data item of a data item pair, the classification module 104 may classify the respective data item pair as checked. In some examples, if the classification module 104 identifies an absence of a snapshot (or does not identify a snapshot as having been recorded alongside a data item of a data item pair), the classification module 104 may classify the respective data item pair as unchecked.

In various implementations, the classification module 104 may classify data item pairs according to one or more rules. The rules may specify the classifications that are to be assigned to a data item pair. For example, the rules may specify that data item pairs associated with certain underlying events should be classified as either checked or unchecked. In various implementations, an underlying event may (automatically) trigger a classification of the associated data item pair(s) by the classification module 104. For example, when a user 130 interacts with the system 100, the classification module 104 may monitor for whether a rule is satisfied and classify data item pair(s) resulting from the user interaction(s) as either checked or unchecked.

Classified data item(s) 210 can include metadata that indicates that the data items are checked and/or unchecked. In various implementations, the data item(s) may be associated with unique identifier(s) 208. For example, when a data transaction is initiated, the associated data item may be assigned a unique identifier such as a transaction ID. In various implementations, the transaction ID can be a sequence number assigned to the data item upon being inserted into and/or committed to the data list. In various implementations, the unique identifier(s) 208 can be a string. In various implementations, the unique identifier(s) 208 may be represented in metadata associated with the data item(s).

The aggregation module 106 can aggregate the data item pair(s) 202 that have been inserted into and/or committed to a target data list to determine and/or update a data list value 218. In various implementations, the aggregation module 106 can compute list values individually for a plurality of data lists, such as may be associated with data items of the data item pair(s) 202. The aggregation module 106 may (automatically) compute the data list value 218, continuously or periodically, as data items are inserted into and/or committed to respective data lists. In various implementations, the aggregation module 106 may compute the data value 218 in response to initiation of a checkpoint 214.

The checkpoint module 108 can initiate a checkpoint 214 for a target data list upon detecting a checkpoint condition 212. Upon initiation of a checkpoint 214, the checkpoint module 108 can access (e.g., obtain, receive, retrieve, and/or the like) the target data list, such as any data items that have been inserted into and/or committed to the data list (including any snapshots) as of the time that checkpoint 214 is initiated. During the checkpoint 214, the checkpoint module 108 can determine an order of the checked and/or unchecked data items that have been recorded (e.g., inserted into and/or committed to) to the target data list, for example, since the most recent previous checkpoint. In various implementations, the checkpoint module 108 may determine an order of the checked data items with respect to other checked data items. In various implementations, the checkpoint module 108 may determine an order of unchecked data items with respect to other unchecked data items. The checkpoint module 108, in various implementations, may determine an order of unchecked data items with respect to checked data items.

The checkpoint module 108 may determine the order of the data items based at least on the snapshot(s) 206 and the unique identifier(s) 208 of data item(s) 210. In various implementations, the checkpoint module 108 may order checked data items with respect to other checked data items based on the unique identifiers 208 of the checked data items. For example, the ordering of checked data items with respect to other checked data items may be based on an insert order of the checked data items (e.g., the order in which checked data items are inserted into the data list). In various implementations, the checkpoint module 108 may determine an order of unchecked data items with respect to other unchecked data items based on the unique identifiers 208 of the unchecked data items. For example, the ordering of unchecked data items with respect to other unchecked data items may be based on an insert order of the unchecked data items. In various implementations, the checkpoint module 108 may order unchecked data items with respect to checked data items based on the one or more snapshots 206. For example, the checkpoint module 108 may order unchecked data items before the earliest checked data item that observed (e.g., based on commit visibility) said unchecked data items. Once the checkpoint module 108 determines and/or updates the order 216 of data items in the target data list, the checkpoint module 108 may commit the ordering information to the data items. Accordingly, the target data list may be ordered up to the point in time of the present checkpoint 214. In this way, data items recorded to the data list during and/or after the present checkpoint 214 may be unordered. The checkpoint module 108 can initiate subsequent checkpoints to update the ordering of the target data list (and/or of another data list).

During the checkpoint 214, in various implementations, the aggregation module 106 may determine and/or update the list value 218 of the target data list based on the values of the checked and/or unchecked data items that have been recorded to the data list since the most recent previous checkpoint. However, in some examples, the list value 218 may not account for any data items that have been recorded to the data list during and/or after the present checkpoint 214.

Figure 3:
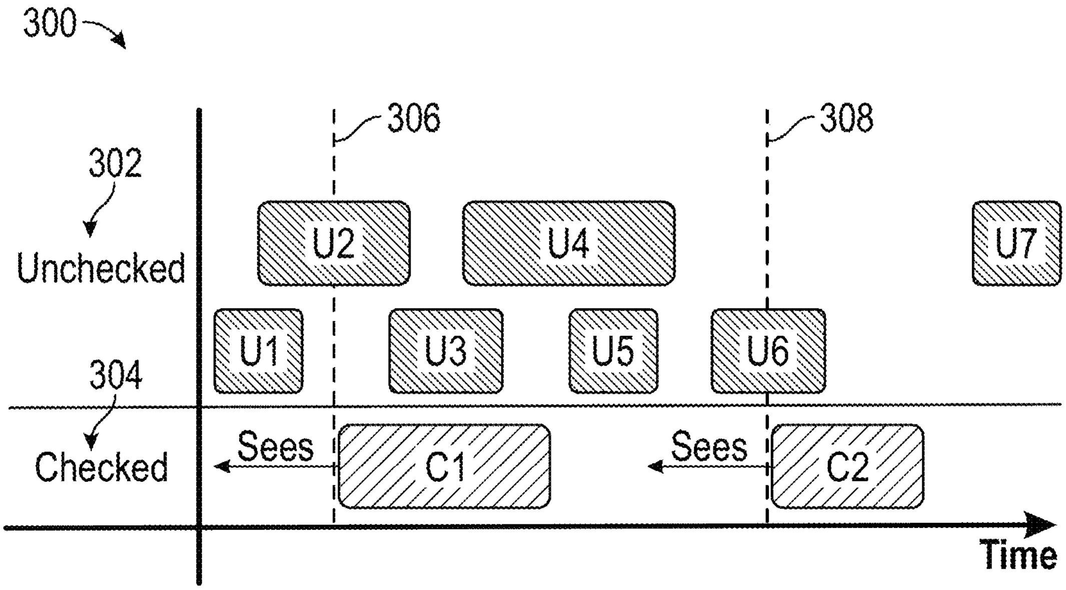
FIG. 3 illustrates an example graph associated with tracking data interactions associated with data lists, according to various implementations of the present disclosure.

Example Graph Relating to Tracking Data Item Interactions Associated with Data Lists FIG. 3 illustrates an example graph 300 associated with a data list, such as described herein. As illustrated in the example of FIG. 3, the graph 300 includes a horizontal axis and a vertical axis. The horizontal axis can correspond to time. The vertical axis can correspond to anything. The graph 300 is separated into two horizontal sections 302 and 304, section 302 corresponding to unchecked data items and section 304 corresponding to checked data items.

Checked data items may be mutually exclusive such that they are neither inserted into nor committed to a data list at the same time as another checked data item. For example, a later checked data item may not be inserted into the data list until an earlier inserted checked data item is committed to the data list. Consequently, checked data items can stake out points of total order for a data list. For example, the checked data items may be used as reference points from which to order unchecked data items. In this way, each snapshot may be paired with exactly one checked data item.

Unchecked data items may not be mutually exclusive. Accordingly, an unchecked data item may be inserted into and/or committed to a data list at the same time or about the same time as another unchecked data item. In various implementations, an unchecked data item may be inserted into and/or committed to a data list at the same time or about the same time as a checked data item.

As depicted in the example implementation of FIG. 3, the section 302 includes a plurality of boxes labeled as (for purposes of illustration) U1 through U7. Each box U1 through U7 represents an unchecked data item. The left-most edge of an unchecked data item box corresponds to the point in time at which the unchecked data item is inserted into a data list. The right-most edge of an unchecked data item box corresponds to the point in time at which the unchecked data item is committed to a data list.

Further depicted in the example implementation of FIG. 3, the section 304 includes a plurality of boxes labeled as (for purposes of illustration) C1 and C2. Each box C1 and C2 represents a checked data item. The left-most edge of a checked data item box corresponds to the point in time at which a snapshot is generated. This can be the beginning of the data transaction associated with the checked data item. For purposes of illustration, generation of snapshots is illustrated by the vertical dashed lines 306 and 308. Each snapshot may be paired with a different checked data item. For example, snapshot 306 may be paired with checked data item C1 and snapshot 308 may be paired with checked data item C2. In this way, snapshot 306 may be recorded to the data list alongside checked data item C1, and snapshot 308 may be recorded to the data list alongside checked data item C2. In various implementations, the left-most edge of the checked data item box may correspond to the point in time at which the checked data item is inserted into a data list. As illustrated in the example of FIG. 3, the right-most edge of a checked data item box corresponds to the point in time at which the checked data item is committed to a data list.

Each checked data item C1 and C2 may 'see' data items that have been inserted into and/or committed to the data list as of the time the respective snapshot is generated. In various implementations, each checked data item C1 and C2 may see only data items that have been committed to the data list as of the time that the system generates snapshots 306 and 308, respectively. In various implementations, each checked data item C1 and C2 may see only data items that have committed to the data list since initiation of the most recent previous snapshot. For example, checked data item C2 may see committed data items up to the previous snapshot 306. However, the checked data item C2 may not see the data items included in the previous snapshot 306; the checked data item C2 may see only that there was a previous snapshot 306. In this way, two snapshots proximate in time can define a snapshot window, wherein the window extends from the time at which a first snapshot is generated to the time at which a second snapshot is generated. The second snapshot may be subsequent in time such that there are no intervening snapshots between the first and second snapshots.

The snapshot window, in various implementations, can include data items inserted and/or committed to the data list from the time that the first snapshot is generated up to the time that the second snapshot is generated. The snapshot window may be inclusive or exclusive of the time at which the first snapshot is generated. In various implementations, the snapshot window may be inclusive or exclusive of the time at which the second snapshot is generated.

In various implementations, unchecked data items may fall into windows between snapshots based on commit visibility. For example, if an unchecked data item commits to the data list before or after generation of a snapshot, the system may determine that the checked data item paired with said snapshot is ordered after or before the unchecked data item, respectively. In various implementations, if an unchecked data item commits to the data list at the same time (or substantially the same time) as generation of a snapshot, depending on isolation levels, the system may determine that the checked data item paired with the snapshot is ordered before the unchecked data item. In some examples, if an unchecked data item commits to the data list at the same time (or substantially the same time) as generation of a snapshot, depending on isolation levels, the system may determine that the checked data item paired with the snapshot is ordered after the unchecked data item. In the example illustrated in FIG. 3, based on commit visibility, unchecked data items U2 through U5 fall within the window defined by snapshots 306 and 308.

In various implementations, a snapshot window may be defined by the most recent previous checkpoint and the first snapshot generated after said previous checkpoint. In various implementations, a snapshot window may be defined by the present checkpoint and the snapshot taken most recently prior to the present checkpoint. In various implementations, when a checkpoint is initiated, there may be only one snapshot captured since the most recent previous checkpoint. In such instances, a snapshot window can be defined by the most recent previous checkpoint and the snapshot and/or by the snapshot and the present checkpoint.

In various implementations, the checked data items may see only unchecked data items. For example, C1 may see only unchecked data items that have been committed to the data list as of the time that snapshot 306 is generated. In this way, snapshot 306 can include unchecked data item U1. In some examples, C2 may see only unchecked data items that have been committed to the data list since generation of snapshot 306 and as of the time that snapshot 308 is generated. Accordingly, snapshot 308 can include unchecked data items U2 through U5.

As described herein, the system may order checked data items based on unique identifiers of the checked data items. For example, in various implementations, the system may order checked data items based on their sequence numbers. In this way, the checked data items may be ordered according to their insert order (e.g., the order in which checked data items are inserted into the data list). In some examples, checked data items may be ordered based on the sequence in which corresponding snapshots are generated.

The system may order unchecked data items with respect to checked data items based on snapshots of the data list. In this way, the system may order unchecked data items with respect to checked data items based on commit visibility of the unchecked data items. For example, the system may order unchecked data items before the earliest checked data item that sees said unchecked data items.

The system may order unchecked data items within each snapshot window based on the unique identifiers of the unchecked data items. For example, in various implementations, the system may order unchecked data items within each snapshot window based on their sequence numbers. In this way, the unchecked data items within a snapshot window may be ordered according to their insert order.

In the example implementation of FIG. 3, the unordered appearance of the unchecked and checked data items in graph 300 may be as follows: U1, U2, C1, U3, U4, U5, U6, C2, U7. However, when the system orders the checked and/or unchecked data items so as to track data interactions with the data list, according to methods described herein above, the order may be as follows: U1, C1, U2, U3, U4, U5, C2, U6, U7.

Figure 4A:
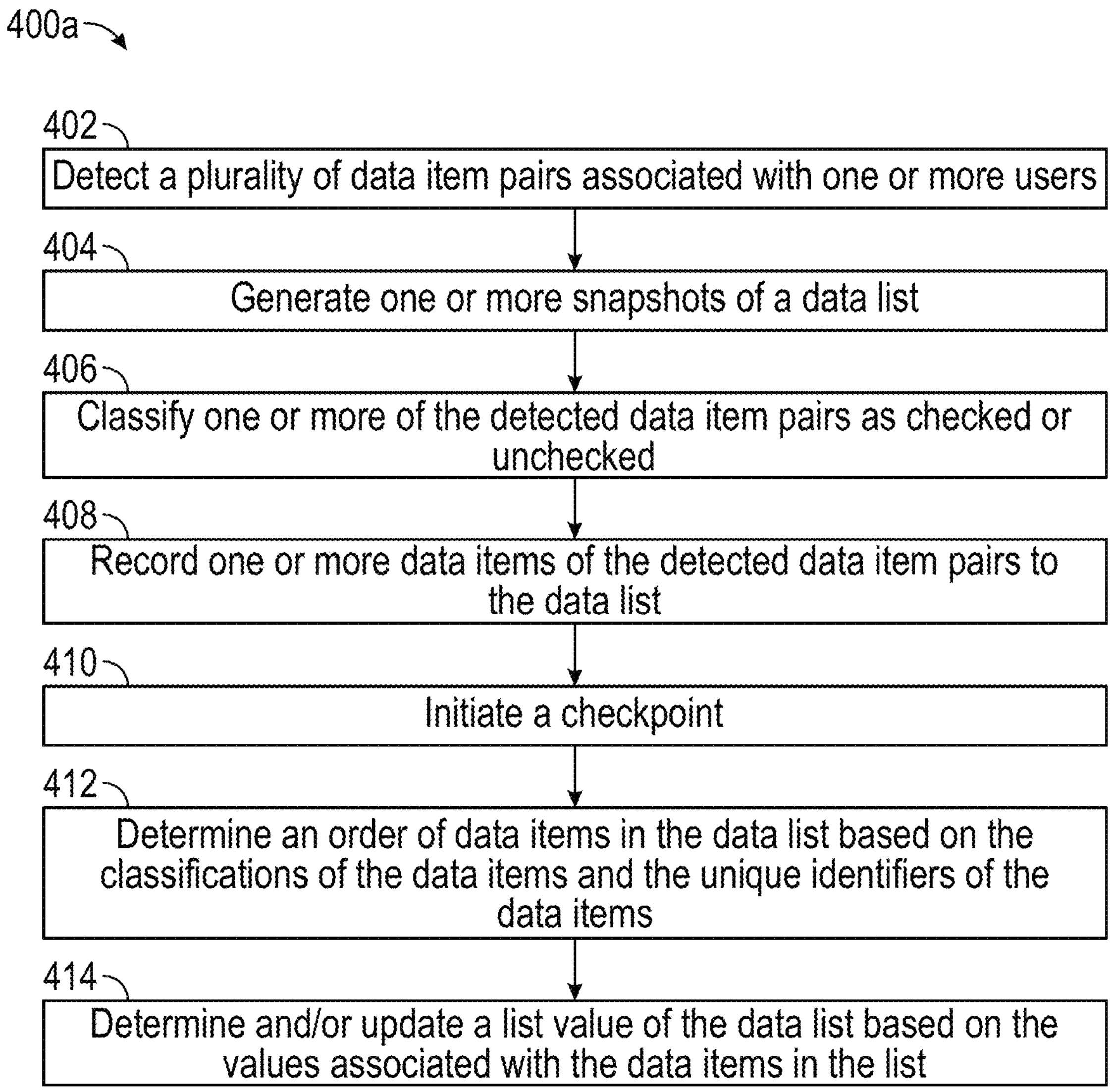
FIGS. 4A-4B are flow diagrams illustrating example processes associated with tracking data interactions associated with data lists, according to various implementations of the present disclosure.

Example Processes Relating to Tracking Data Item Interactions Associated with Data Lists FIG. 4A is a flow diagram illustrating an example process 400*a* relating to tracking data item interactions associated with data lists, such as paired data lists (e.g., overlapping lists). The process 400*a*, or portions thereof, can be implemented by a computing device such as a hardware processor. The process 400*a*, or portions thereof, can be executed by one or more hardware processors, whether they are associated with a singular or multiple computing devices like user device 130, data list tracking system 100, and/or devices in remote or wireless communication. The implementation may vary. For example, it could be controlled by processors related to a system, such as system 100, or can involve modifications like omitting blocks, adding blocks, rearranging the order of execution of the blocks, combining blocks, and/or separating blocks into additional blocks. The process 400*a* serves as an example and is not intended to restrict the present disclosure. In various implementations, one or more portions of example process 400*a* may or may not be performed in the ordinary course of tracking data interactions associated with data lists. In various implementations, the process 400*a*, or portions thereof, can be performed by a computing device associated with the system 100, such as the classification module 102, snapshot module 104, checkpoint module 106, and/or one or more components thereof as described herein.

Beginning at block 402, a hardware computer processor (e.g., associated with system 100 and/or components thereof) is configured to detect a plurality of data item pairs associated with one or more users. In various implementations, a user may engage in an event, which causes generation of a corresponding data item pair. For example, the user may engage in a transfer with an entity. Events can correspond to event types. In various implementations, for example, the event may be an irreversible event (e.g., an irrevocable and/or uncontestable event) such that that event cannot be undone once processed (e.g., once associated data items are recorded and/or processed). In various implementations, the event may be a reversible event (e.g., a revocable and/or contestable event) such that that event can be undone even if processed (e.g., associated data items are recorded and/or processed). The data item pairs may be associated with one or more data lists, such as paired data lists. The paired lists can include overlapping data lists, such as desired herein.

Each data item in a data item pair can be associated with a unique identifier. The unique identifier can be anything. In various implementations, the unique identifier can be a string, one or more numbers, and/or the like. In various implementations, the unique identifier can be represented by metadata of the data item. Additionally, each data item can be associated with a value, such as a positive or negative value. In various implementations, each data item may be timestamped, such as based on the time at which the data item is generated or detected. In various implementations, the data items may be timestamped when recorded (e.g., inserted and/or committed) to a data list.

At block 404, the processor is configured to generate one or more snapshots of the data list. For example, the processor can detect a snapshot condition and, responsive to detecting the snapshot condition, generate a snapshot. In various implementations, the snapshot condition can include, but is not limited to, user input to generate a snapshot (e.g., user input to lock or observe a list), detection and/or recording (e.g., inserting into and/or committing data items to a list) of certain data item pairs or data items such as may originate from a checked event, detection of certain underlying events (e.g., checked events), and/or the like.

The present snapshot can include data items that have been inserted into and/or committed to the data list up to the most recent previous snapshot. The present snapshot may not include any data items that have been inserted into and/or committed to the data list during or after generation of the present snapshot. In various implementations, the present snapshot may include only data items that have been committed to the data list. The processor can be configured to store the snapshots, such as for further analysis. For example, the processor can pair each snapshot with a different data item and record the snapshot to the data list alongside the respective data item. In this way, each snapshot may be paired with a single data item, and no two snapshots may be paired with the same data item.

At block 406, the processor is configured to classify one or more of the detected data item pairs as checked and/or unchecked, such as described herein. Checked data item pairs can include checked data items. Unchecked data item pairs can include unchecked data items. In various implementations, the processor is configured to classify the data item pairs based on the presence (or lack thereof) of a snapshot recorded alongside one or both data items of the data item pair. For example, if the processor identifies that a snapshot is paired with a data item in the data item pair, the processor may classify said data item pair as checked. In some examples, if the processor identifies that no snapshot is paired with either data item in the data item pair, the processor may classify said data item pair as unchecked.

In various implementations, at block 404, the processor is configured to classify the data item pairs based on one or more sets of rules. For example, the rules can specify that data items associated with certain underlying events should be classified as either checked or unchecked. For example, the data item pairs can include event-related information, and the processor can access this information and determine that the data item pair is associated with a particular event type, such as a checked or unchecked event.

At block 408, the processor is configured to record one or more data items of the detected data items pairs to a data list. For example, the processor may insert into and/or commit to the data list one or more of the data items.

At block 410, the processor is configured to initiate a checkpoint. For example, the processor can detect a checkpoint condition and, responsive to the checkpoint condition, initiate a checkpoint. In various implementations, the checkpoint condition can include user input to initiate a checkpoint. For example, responsive to detecting user input to initiate a checkpoint, the processor may initiate the checkpoint.

In various implementations, the checkpoint condition can be based on the quantity of data item pairs, such as based on the quantity of data item pairs detected and/or received by the system. In various implementations, the processor may be configured to initiate the checkpoint based on whether the quantity of detected data items satisfies a threshold condition. For example, the processor may be configured to determine whether a value of the quantity of data item pairs satisfies the threshold condition. In some examples, the processor may be configured to determine whether a change in value of the quantity of data item pairs satisfies the threshold condition. In some examples, the processor may be configured to determine whether a rate of change in value of the quantity of data item pairs satisfies the threshold condition. In some examples, the processor may be configured to determine whether a change in the rate of change in value of the quantity of detected data items satisfies the threshold condition. Responsive to determining that the threshold condition is satisfied, the processor may initiate the checkpoint.

At block 410, the threshold condition(s) can include upper limits and/or lower limits. In various implementations, the threshold condition(s) may include a threshold number or a threshold range of numbers. The threshold condition(s) may be predetermined threshold(s). In various implementations, the threshold condition(s) may be fixed or programmable. In various implementations, the threshold condition(s) may be based at least on part on a history of user data such as relating to average of historical user data. In various implementations, the threshold condition(s) can include dynamic and/or adaptive threshold(s), such as based on identified patterns and/or trends.

In various implementations, at block 410, the checkpoint condition may be based on a predetermined time and/or schedule. For example, at certain time(s) (e.g., different times over the course of a day, a week, and/or the like), the processor may be configured to initiate checkpoints.

At block 412, the processor is configured to determine an order of the data items that have been recorded to the data list. The processor may determine the order of data items within a checkpoint window. The checkpoint window can include data items recorded to (e.g., inserted into and/or committed to) the data list up to the most recent previous checkpoint and as of the present checkpoint. In various implementations, during a checkpoint, the processor may be configured to ignore any data items that are outside of the checkpoint window, such as data items that were inserted and/or committed before the most recent previous checkpoint and/or data items that have been newly inserted and/or committed to the data list during and/or after the current checkpoint. The processor may be configured to determine the order of the data items based at least on the classifications of the data items and the unique identifiers of the data items. For example, the processor may be configured to order the checked and unchecked data items based on the one or more snapshots and the sequence numbers of said checked and/or unchecked data items, such as described herein.

At block 414, the processor is configured to determine and/or update a list value associated with the data list. The list value may be based on previously recorded data items in the data list. In various implementations, the processor may update the list value as data items are recorded to the data list, such as on a continual or periodic basis. The processor may compute the data list value independent of any checkpoints or ordering of the data items.

In various implementations, at block 414, the processor may update the list value based on the values of the data items within the checkpoint window. In this way, the processor can continuously and/or periodically update list value each time a checkpoint is initiated. When updating the list value, the processor may ignore the values associated with any data items that are outside of the checkpoint window.

Figure 4B:
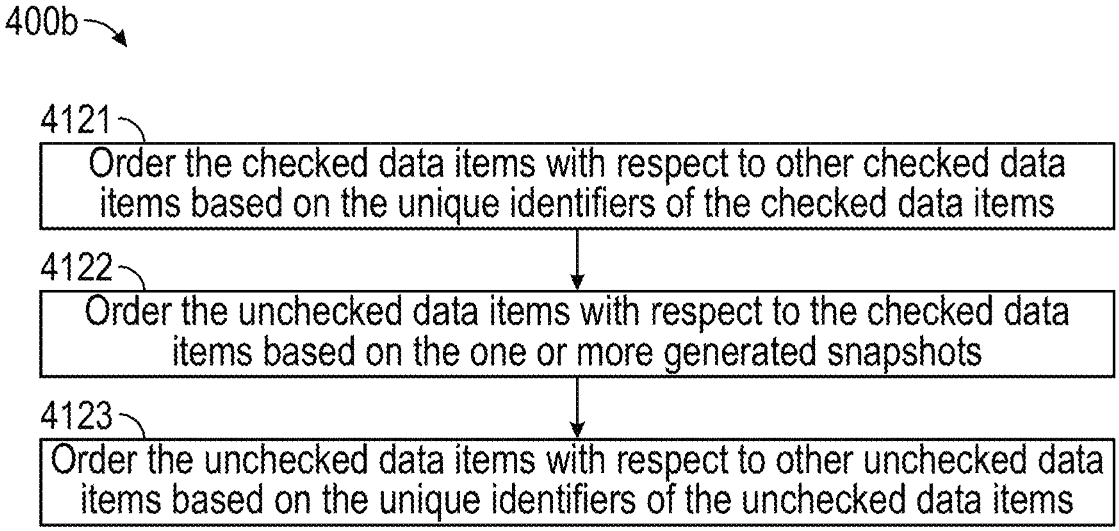

FIG. 4B is a flow diagram illustrating an example process 400*b* relating to tracking data item interactions associated with data lists, such as paired data lists (e.g., overlapping lists). The process 400*b*, or portions thereof, can be implemented by a computing device such as a hardware processor. The process 400*b*, or portions thereof, can be executed by one or more hardware processors, whether they are associated with a singular or multiple computing devices like user device 130, data list tracking system 100, and/or devices in remote or wireless communication. The implementation may vary. For example, it could be controlled by processors related to a system, such as system 100, or can involve modifications like omitting blocks, adding blocks, rearranging the order of execution of the blocks, combining blocks, and/or separating blocks into additional blocks. The process 400*b* serves as an example and is not intended to restrict the present disclosure. In various implementations, one or more portions of example process 400*b* may or may not be performed in the ordinary course of tracking data interactions associated with data lists. In various implementations, the process 400*b*, or portions thereof, can be performed by a computing device associated with the system 100, such as the classification module 102, snapshot module 104, checkpoint module 106, and/or one or more components thereof as described herein.

Beginning at block 4121, a hardware computer processor (e.g., associated with system 100 and/or components thereof) is configured to determine an order of checked data items recorded to a data list with respect to other checked data items recorded to the data list. The processor may determine the order of checked data items recorded to the data list within the checkpoint window. When determining the order of checked data items, the processor may ignore any checked data items that are outside of the checkpoint window. This may include any checked data items that were inserted and/or committed to the data list before the most recent previous checkpoint, and/or checked data items that were inserted into and/or committed to the data list during and/or after the current checkpoint. The processor may determine the order of checked data items based on the unique identifiers of said checked data items. In various implementations, the processor may be configured to determine the order of the checked data items based on the sequence numbers of the checked data items. In this way, the processor may order the checked data items based on the insert order of the checked data items.

At block 4122, the processor is configured to determine an order of unchecked data items recorded to the data list with respect to the checked data items recorded to the data list. The processor may determine the order of unchecked data items recorded to the data list within the checkpoint window. When determining the order of unchecked data items, the processor may ignore any unchecked data items that are outside of the checkpoint window. This may include any unchecked data items that were inserted and/or committed to the data list before the most recent previous checkpoint, and/or unchecked data items that were inserted into and/or committed to the data list during and/or after the current checkpoint. The processor may determine the order of unchecked and checked data items based on the one or more generated snapshots. For example, the processor may determine the order of unchecked and checked data items based on the commit visibility of at least the unchecked data items. In this way, the processor may be configured to order unchecked data items in front of the earliest checked data item before which said checked data item the unchecked data items were committed.

At block 4123, the processor is configured to determine an order of unchecked data items recorded to the data list with respect to other unchecked data items recorded to the data list. The processor may be configured to determine the order of unchecked data items that are included in each snapshot that is analyzed during the checkpoint. For example, the processor can determine the order of unchecked data items that fall within each snapshot window. The processor may determine the order of unchecked data items within each snapshot window based on the unique identifiers of said unchecked data items. In various implementations, the processor may be configured to determine the order of the unchecked data items based on the sequence numbers of the unchecked data items. In this way, the processor may order the unchecked data items within each snapshot window based on the insert order of the unchecked data items.

Upon determining the order of the checked and unchecked data items that have been recorded to the data list, the processor may commit the order information to each said data item. In this way, the processor may make the order of the data list, for example, up to the point of the checkpoint permanent.

Additional Example Implementations and Details

In various implementations, the systems or devices described herein (e.g., one or more aspects of the system 100, data source(s) 110, user device 130, data list(s) 140, and/or the like) may comprise, or be implemented in, a "virtual computing environment". As used herein, the term "virtual computing environment" should be construed broadly to include, for example, computer-readable program instructions executed by one or more processors to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In various implementations the virtual computing environment may comprise one or more virtual machines, containers, and/or other types of emulations of computing systems or environments. In various implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in various implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 5 shows a block diagram that illustrates a computer system 1000 upon which various implementations and/or aspects (e.g., one or more aspects of the system 100, data source(s) 110, user device 130, data list(s) 140, and/or the like) may be implemented. Multiple such computer systems 1000 may be used in various implementations of the present disclosure. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random-access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. The main memory 1006 may, for example, include instructions to implement server instances, queuing modules, memory queues, storage queues, user interfaces, and/or other aspects of functionality of the present disclosure, according to various implementations.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), and/or the like, is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In various implementations, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware, and/or program logic which in combination with the computer system causes or programs computer system 1000 to be a special-purpose machine. According to one implementation, the techniques herein are performed by computer system 1000 in response to processor(s) 1004 executing one or more sequences of one or more computer-readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicate with a WAN). Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds at which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

EXAMPLE ASPECTS

Examples of implementations of the present disclosure can be described in view of the following example aspects. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example aspects below, or any features of the example aspects, can be combined with any one or more other example aspects, or features of the example aspects or other features of the present disclosure.

Aspect 1. A computer-implemented method, the computer-implemented method comprising, by one or more processors executing program instructions: detecting a plurality of data item pairs associated with one or more users, wherein each of the plurality of data item pairs is associated with a unique identifier and a data item value, and wherein each of the plurality of data item pairs is classified as either checked or unchecked; recording one or more data items of the plurality of detected data item pairs to a data list, wherein the data list is associated with a list value based on previously recorded data items; detecting a present checkpoint condition, wherein the present checkpoint condition is associated with a present checkpoint time; and responsive to detecting the present checkpoint condition: determining an order of data items within a checkpoint window based on (1) the classifications of said data items and (2) the unique identifiers of said data items, wherein the checkpoint window comprises data items recorded to the data list up to a most recent previous checkpoint time and before the present checkpoint time.

Aspect 2. The computer-implemented method of Aspect 1 further comprising, by the one or more processors executing program instructions: updating the list value based on the values of the data items newly recorded to the data list.

Aspect 3. The computer-implemented method of Aspect 2, wherein updating the list value is order-independent.

Aspect 4. The computer-implemented method of Aspect 1 further comprising, by the one or more processors executing program instructions: updating the list value based on the values of the data items within the checkpoint window.

Aspect 5. The computer-implemented method of Aspect 1, wherein the present checkpoint condition comprises at least one of: user input to initiate a checkpoint; a quantity of detected data item pairs; or a predetermined time.

Aspect 6. The computer-implemented method of Aspect 5, wherein the present checkpoint time is associated with at least one of: a time when the user input is provided or received; or the predetermined time.

Aspect 7. The computer-implemented method of Aspect 1 further comprising, by the one or more processors executing program instructions: ordering checked data items within the checkpoint window based on the unique identifiers of said checked data items.

Aspect 8. The computer-implemented method of Aspect 1 further comprising, by the one or more processors executing program instructions: detecting a snapshot condition; and responsive to detecting the snapshot condition, generating one or more snapshots of the data list, wherein each snapshot is associated with a respective checked data item.

Aspect 9. The computer-implemented method of Aspect 8, wherein the snapshot condition comprises at least one of: user input to lock or view the data list; detecting or recording a data item originating from a checked event; or detecting a checked event.

Aspect 10. The computer-implemented method of claim 8, wherein for each snapshot, the snapshot comprises only data items that have been committed to the data list as of a time that the snapshot is generated.

Aspect 11. The computer-implemented method of Aspect 10, wherein no two snapshots comprises the same data items.

Aspect 12. The computer-implemented method of Aspect 10, wherein each snapshot is paired with a different checked data item.

Aspect 13. The computer-implemented method of Aspect 8 further comprising, by the one or more processors executing program instructions: ordering unchecked data items within the checkpoint window based on the one or more snapshots, wherein the ordering is with respect to checked data items within the checkpoint window, and wherein the unchecked data items fall within one or more snapshot windows.

Aspect 14. The computer-implemented method of Aspect 13, further comprising, by the one or more processors executing program instructions: ordering the unchecked data items before an earliest checked data item that observed said unchecked data items, wherein the observing is based on commit visibility of the unchecked data items.

Aspect 15. The computer-implemented method of Aspect 13 further comprising, by the one or more processors executing program instructions: ordering unchecked data items within a snapshot window based on the unique identifiers of said unchecked data items.

Aspect 16. The computer-implemented method of Aspect 1, further comprising, by the one or more processors executing program instructions: committing the determined order of data items to the data list such that the order of the data list is updated up to the present checkpoint time.

Aspect 17. The computer-implemented method of Aspect 1, wherein at least some unchecked data items are not mutually exclusive.

Aspect 18. The computer-implemented method of Aspect 1, wherein all checked data items are mutually exclusive.

Aspect 19. A system comprising: one or more computer-readable storage mediums or devices comprising, configured to store, and/or storing program instructions; and one or more processors configured to execute the program instructions to cause the system to perform the computer-implemented method of any of Aspects 1-18.

Aspect 20. One or more computer-readable storage mediums or devices comprising, configured to store, and/or storing program instructions, the program instructions executable by one or more processors to cause the one or more processors to perform the computer-implemented method of any of Aspects 1-18.

What is claimed is:

1. A computer-implemented method, the computer-implemented method comprising, by one or more hardware processors executing program instructions:

detecting a plurality of data item pairs associated with one or more users, wherein each of the plurality of data item pairs is associated with a unique identifier and a data item value, and wherein each of the plurality of data item pairs is classified as either checked or unchecked;

recording, in one or more non-transitory storage mediums, one or more data items of the plurality of detected data item pairs to a data list, wherein the data list is associated with a list value based on data items previously recorded to the data list;

detecting a snapshot condition;

responsive to detecting the snapshot condition, generating one or more snapshots of the data list, wherein each of the one or more snapshots operate to preserve a consistent view of a state of the data list reflecting at least one of the one or more data items recorded to the data list since a most recent previous snapshot, and wherein each of the one or more snapshots is associated with a respective checked data item of the one or more recorded data items;

recording, in the one or more non-transitory storage mediums, the one or more snapshots of the data list;

detecting a checkpoint condition, wherein the checkpoint condition is associated with a present checkpoint time;

responsive to detecting the checkpoint condition:

determining a checkpoint window as a time interval from a most recent previous checkpoint to the present checkpoint; and determining an order of the recorded one or more data items within the checkpoint window based on (1) classifications of the recorded one or more data items recorded during the checkpoint window, (2) the unique identifiers of the recorded one or more data items, and (3) the one or more snapshots of the data list generated during the checkpoint window; and updating the data list to reflect the determined order of the recorded one or more data items.

2. The computer-implemented method of claim 1 further comprising, by the one or more processors executing program instructions:

updating the list value based on the values of the one or more data items newly recorded to the data list.

3. The computer-implemented method of claim 2, wherein updating the list value is order-independent.

4. The computer-implemented method of claim 1 further comprising, by the one or more processors executing program instructions:

updating the list value based on the values of the one or more data items recorded to the data list during the checkpoint window.

5. The computer-implemented method of claim 1, wherein the checkpoint condition comprises at least one of:

user input to initiate a checkpoint;

a quantity of detected data item pairs; or a predetermined time.

6. The computer-implemented method of claim 5, wherein the checkpoint time is associated with at least one of:

a time when the user input is provided or received; or the predetermined time.

7. The computer-implemented method of claim 1 further comprising, by the one or more processors executing program instructions:

ordering checked data items within the checkpoint window based on the unique identifiers of said checked data items.

8. The computer-implemented method of claim 1, wherein the snapshot condition comprises at least one of:

user input to lock or view the data list;

detecting or recording a data item originating from a checked event; or detecting a checked event.

9. The computer-implemented method of claim 1, wherein for each snapshot, the snapshot comprises only data items that have been committed to the data list as of a time that the snapshot is generated.

10. The computer-implemented method of claim 8, wherein no two snapshots comprise the same data items.

11. The computer-implemented method of claim 8, wherein each snapshot is paired with a different checked data item.

12. The computer-implemented method of claim 1 further comprising, by the one or more processors executing program instructions:

ordering unchecked data items within the checkpoint window based on the one or more snapshots, wherein the ordering is with respect to checked data items within the checkpoint window, and wherein the unchecked data items fall within one or more snapshot windows.

13. The computer-implemented method of claim 11, further comprising, by the one or more processors executing program instructions:

ordering the unchecked data items before an earliest checked data item that observed said unchecked data items, wherein the observing is based on commit visibility of the unchecked data items.

14. The computer-implemented method of claim 11 further comprising, by the one or more processors executing program instructions:

ordering unchecked data items within a snapshot window based on the unique identifiers of said unchecked data items.

15. The computer-implemented method of claim 1, further comprising, by the one or more processors executing program instructions:

committing the determined order of data items to the data list such that the order of the data list is updated up to the present checkpoint time.

16. The computer-implemented method of claim 1, wherein at least some unchecked data items are not mutually exclusive.

17. The computer-implemented method of claim 1, wherein all checked data items are mutually exclusive.

18. The computer-implemented method of claim 1, wherein updating the data list to reflect the determined order of the recorded one or more data items comprises:

committing the determined order to the data list; and discarding the one or more snapshots from the one or more non-transitory storage mediums.

19. A system comprising:

one or more non-transitory storage mediums configured to store program instructions; and one or more hardware processors in communication with the one or more non-transitory storage mediums, the one or more hardware processors configured to execute the program instructions to:

detect a plurality of data item pairs associated with one or more users, wherein each of the plurality of data item pairs is associated with a unique identifier and a data item value, and wherein each of the plurality of data item pairs is classified as either checked or unchecked;

record, in a second one or more non-transitory storage mediums, one or more data items of the plurality of detected data item pairs to a data list, wherein the data list is associated with a list value based on data items previously recorded to the data list;

detect a snapshot condition;

responsive to detecting the snapshot condition, generate one or more snapshots of the data list, wherein each of the one or more snapshots operate to preserve a consistent view of a state of the data list reflecting at least one of the one or more data items recorded to the data list since a most recent previous snapshot, and wherein each of the one or more snapshots is associated with a respective checked data item of the one or more recorded data items;

record, in the second one or more non-transitory storage mediums, the one or more snapshots;

detect a checkpoint condition, wherein the checkpoint condition is associated with a present checkpoint time;

responsive to detecting the checkpoint condition:

determine a checkpoint window as a time interval from a most recent previous checkpoint to the present checkpoint; and determine an order of the recorded one or more data items within the checkpoint window based on (1) classifications of the recorded one or more data items recorded during the checkpoint window, (2) the unique identifiers of the recorded one or more data items, and (3) the one or more snapshots of the data list generated during the checkpoint window; and update the data list to reflect the determined order of the recorded one or more data items.

20. One or more non-transitory computer-readable storage mediums or devices comprising, configured to store, and/or storing program instructions, the program instructions executable by one or more hardware processors to cause the one or more hardware processors to:

detect a plurality of data item pairs associated with one or more users, wherein each of the plurality of data item pairs is associated with a unique identifier and a data item value, and wherein each of the plurality of data item pairs is classified as either checked or unchecked;

record, in a second one or more non-transitory storage mediums, one or more data items of the plurality of detected data item pairs to a data list, wherein the data list is associated with a list value based on data items previously recorded to the data list;

detect a snapshot condition;

responsive to detecting the snapshot condition, generate one or more snapshots of the data list, wherein each of the one or more snapshots operate to preserve a consistent view of a state of the data list reflecting at least one of the one or more data items recorded to the data list since a most recent previous snapshot, and wherein each of the one or more snapshots is associated with a respective checked data item of the one or more recorded data items;

record, in the second one or more non-transitory storage mediums, the one or more snapshots;

detect a checkpoint condition, wherein the checkpoint condition is associated with a present checkpoint time;

responsive to detecting the checkpoint condition:

determine a checkpoint window as a time interval from a most recent previous checkpoint to the present checkpoint; and determine an order of the recorded one or more data items within the checkpoint window based on (1) classifications of the recorded one or more data items recorded during the checkpoint window, (2) the unique identifiers of the recorded one or more data items, and (3) the one or more snapshots of the data list generated during the checkpoint window; and update the data list to reflect the determined order of the recorded one or more data items.

* * * * *